（12） United States Patent
Jones et al.

(10) Patent No.: US 10,380,390 B2
(45) Date of Patent: Aug. 13, 2019

(54) SHOPPING CART WITH AN RFID INTERFACE AND ASSOCIATED SYSTEMS AND METHODS

(71) Applicant: Walmart Apollo, LLC, Bentonville, AR (US)

(72) Inventors: Matthew Allen Jones, Bentonville, AR (US); Nicholaus Adam Jones, Fayetteville, AR (US); Aaron Vasgaard, Fayetteville, AR (US); Bruce W. Wilkinson, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/878,807

(22) Filed: Jan. 24, 2018

(65) Prior Publication Data

US 2018/0211072 A1 Jul. 26, 2018

Related U.S. Application Data

(60) Provisional application No. 62/450,698, filed on Jan. 26, 2017.

(51) Int. Cl.
*G06K 7/10* (2006.01)
*G06K 19/07* (2006.01)
(Continued)

(52) U.S. Cl.
CPC ..... *G06K 7/10297* (2013.01); *G06K 7/10366* (2013.01); *G06K 19/0723* (2013.01); *B62B 3/10* (2013.01); *B62B 5/06* (2013.01)

(58) Field of Classification Search
CPC ............ H01H 2300/032; G06F 3/0202; G06F 3/0231; G06K 7/10297; G06K 7/10366
See application file for complete search history.

(56) References Cited

U.S. PATENT DOCUMENTS 7,660,747 B2  2/2010 Brice et al.
8,589,259 B2 11/2013 Kunieda et al.
(Continued)

FOREIGN PATENT DOCUMENTS

AU  2013101455 A4  12/2013
CN    102963407 A   3/2013
(Continued)

OTHER PUBLICATIONS

The future of retail isn't what you think, Digital Services, http://www.strategyand.pwc.com/digital/, 2010-2016.
(Continued)

*Primary Examiner* — Laura A Gudorf
(74) *Attorney, Agent, or Firm* — McCarter & English, LLP; David R. Burns (57) ABSTRACT

Described in detail herein are systems and methods for interacting with an interactive display using a shopping cart. A user navigate a shopping cart to a computing system including an interactive display and can actuate or press one or more push buttons associated with RFID tags integrated with the handle portion on a shopping cart to interact with the interactive display. A unique identifier can be associated with each RFID tag. A RFID reader disposed with respect to the computing system can detect the unique identifiers associated with the one or more detected RFID tags. The RFID reader can transmit the unique identifiers to the computing system. The computing system can execute the retrieved actions on the interactive display, based on the one or more buttons actuated or pushed and the correlated RFID tags.

12 Claims, 7 Drawing Sheets

(51) Int. Cl.
  B62B 3/10 (2006.01)
  B62B 5/06 (2006.01)

(56) References Cited

U.S. PATENT DOCUMENTS

| | | | |
|---|---|---|---|
| 8,639,543 | B2 | 1/2014 | Boss et al. |
| 8,950,671 | B2 | 2/2015 | Chan et al. |
| 9,378,484 | B1 | 6/2016 | Russell et al. |
| 2001/0028301 | A1* | 10/2001 | Geiger ................ B62B 3/1408 340/5.91 |
| 2002/0170961 | A1 | 11/2002 | Dickson et al. |
| 2005/0062247 | A1 | 3/2005 | Sheem |
| 2005/0187819 | A1 | 8/2005 | Johnson |
| 2006/0010027 | A1 | 1/2006 | Redman |
| 2006/0289637 | A1 | 12/2006 | Brice et al. |
| 2007/0228678 | A1 | 10/2007 | Solomon et al. |
| 2008/0231432 | A1 | 9/2008 | Stawar et al. |
| 2008/0243626 | A1 | 10/2008 | Stawar et al. |
| 2010/0277320 | A1* | 11/2010 | Gold .................... G06K 19/041 340/572.1 |
| 2011/0012713 | A1* | 1/2011 | Wilkinson ......... G06K 7/10178 340/10.3 |
| 2012/0296751 | A1 | 11/2012 | Napper |
| 2014/0001258 | A1 | 1/2014 | Chan et al. |
| 2014/0176307 | A1* | 6/2014 | Forster ............ G06K 19/07345 340/10.4 |
| 2015/0206121 | A1 | 7/2015 | Joseph et al. |
| 2015/0356329 | A1 | 12/2015 | Erez et al. |

FOREIGN PATENT DOCUMENTS

| | | |
|---|---|---|
| DE | 202005005851 U1 | 6/2005 |
| EP | 623904 A1 | 11/1994 |
| EP | 2072371 A2 | 6/2009 |
| WO | 200193150 A1 | 12/2001 |
| WO | 2006053381 A1 | 5/2006 |

OTHER PUBLICATIONS

Zimmerman, Ann, Chout the Future of SHoppipng—Shaving Time Off the Weekly Grocery Run to Keep Consumers in Stores and Spending, The Wall Street Journal, May 18, 2011.
International Search Report and Written Opinion for Application No. PCT/US2018/014967, dated Mar. 16, 2018. 10 pages.
U.S. Appl. No. 15/878,799, filed Jan. 24, 2018, Pending.
U.S. Appl. No. 15/878,803, filed Jan. 24, 2018, Pending.

* cited by examiner

SHOPPING CART WITH AN RFID INTERFACE AND ASSOCIATED SYSTEMS AND METHODS

CROSS-REFERENCE TO RELATED PATENT APPLICATIONS

This application claims priority to U.S. Provisional Application No. 62/450,698 filed on Jan. 26, 2017, the content of which is hereby incorporated by reference in its entirety.

BACKGROUND

Operating a shopping cart and simultaneously interacting with a computing system can be a cumbersome process.

BRIEF DESCRIPTION OF DRAWINGS

Illustrative embodiments are shown by way of example in the accompanying drawings and should not be considered as a limitation of the present disclosure.

DETAILED DESCRIPTION

Described in detail herein are systems and methods for interacting with an interactive display using a shopping cart. A user can navigate a shopping cart to a computing system including an interactive display and can actuate or press one or more push buttons associated with RFID tags integrated with the handle portion on a shopping cart to interact with the interactive display. The RFID tags can include a near-field component and a far-field component. The near-field and far field components can be mechanically and electrically decoupled from each other in a non-operating position of the RFID tag and can be mechanically and electrically coupled to each other in an operating position of the RFID tag. The actuating or pressing of the one or more push buttons can cause the near-field and far-field components to transition between the non-operating position and the operating position. A unique identifier can be associated with each RFID tag. A RFID reader can be disposed with respect to the computing system. The RFID reader can detect the one or more RFID tags associated with the one or more push buttons actuated or pressed by the user in response to the RFID tags being in range of the RFID reader and the near field component and the far field component being mechanically and electrically coupled (i.e. in the operating position). The RFID reader can extract the unique identifiers associated with the one or more RFID tags from radiofrequency signals transmitted by the RFID tags. The RFID reader can transmit the unique identifiers to the computing system. The computing system can retrieve the actions correlated with the read RFID tags using the unique identifiers. The computing system can execute the retrieved actions on the interactive display based on the one or more buttons actuated or pushed and the correlated RFID tags in the operating position.

In exemplary embodiments, a shopping cart includes, a cart including a frame having a handle portion, a basket supported by the frame, and casters configured to support the frame, one or more actuators disposed on the handle portion, a plurality of RFID tags integrated with the handle portion. At least one of the RFID tags can include a near-field component and a far-field component. The near field component and the far field component of the at least one RFID tags can be configured to be selectively coupled or decoupled in response to actuation of one of the one or more actuators. The system further includes at least one RFID reader configured to communicate with the at least one of the RFID tags in response to the actuator being actuated to couple the near field component and far field component. The system further includes a computing system operatively coupled to the RFID reader. The computing system can include an interactive display and can be programmed to execute an action on the interactive display in response to communication between the RFID tag having the coupled near-field and far-field components and the RFID reader. The actuator can include a discrete mechanical push button. The far-field component can be a far-field antenna tuned to a specified frequency.

In another embodiment, a shopping cart system includes a cart including a frame having a handle portion, a basket supported by the frame, and a plurality of caster configured to support the frame, an actuator disposed on the handle portion, a plurality of RFID tags integrated with the handle portion. At least one of the RFID tags includes a near field component and a far field component. The near field component and the far field component are configured to be selectively coupled or decoupled in response to actuation of the actuator. The system further includes a plurality of RFID readers configured to communicate with the at least one of the RFID tags in response the at least one RFID tag being within range of the plurality of RFID readers and in response to the actuator being actuated to couple the near field component and far field component. The system further includes a plurality of computing systems. Each computing system is coupled to at least one of the plurality of RFID readers and includes an interactive display. Each of the computing system is programmed to receive communications from the at least one of the plurality of RFID tags via the at least one of the plurality of RFID readers operatively coupled thereto in response the at least one RFID tag being within range of the at least one of the plurality of RFID readers and in response to the actuator being actuated to couple the near field component and far field component; determine whether to process the communications based on an amplitude or signal power of the radiofrequency communications received by the at least one of the plurality of RFID readers in response to determining that the amplitude or signal power of the radiofrequency communications is below a threshold amplitude or signal power; ignore the communications and in response to determining that the amplitude or signal power of the radiofrequency communications is above a threshold amplitude or signal power;

identify data encoded in the communications; and execute one or more actions on the interactive display in response to data.

Figure 1A:
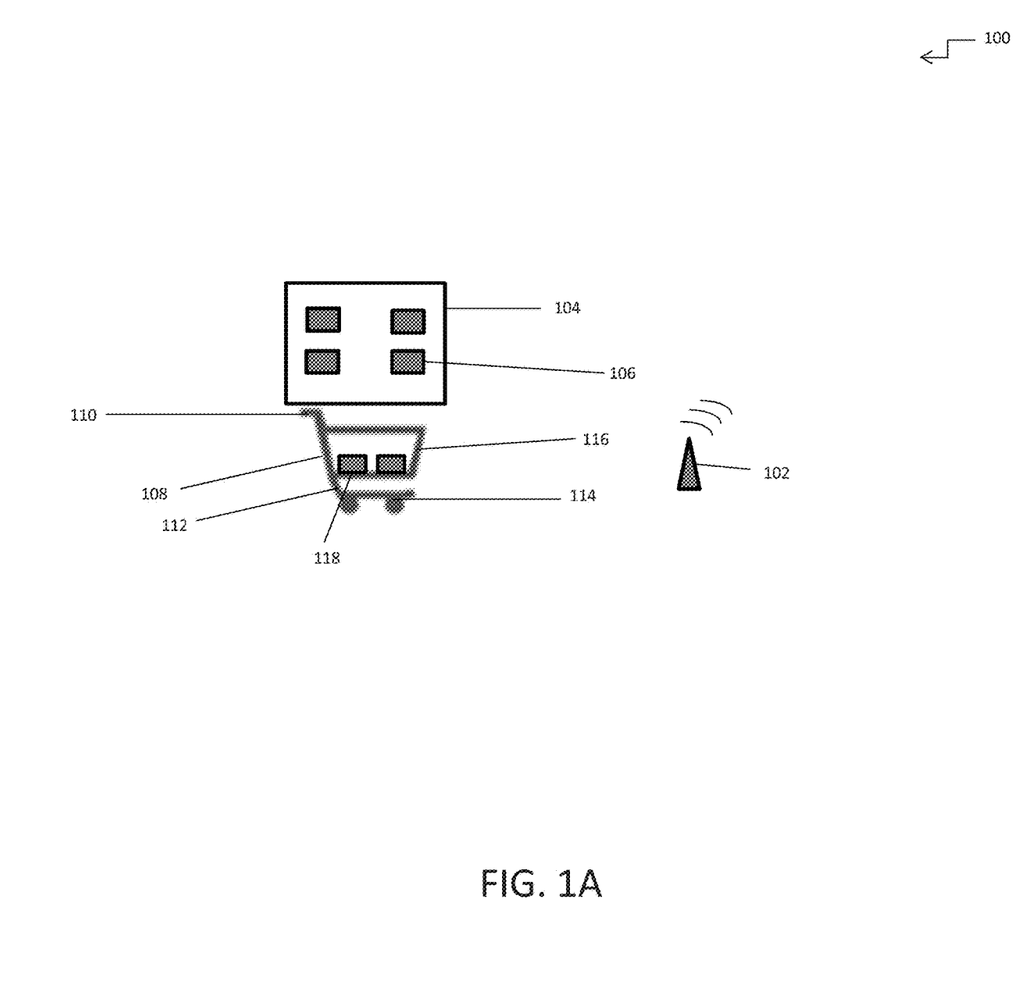
FIG. 1A is a diagram of a shopping cart and an interactive display in a facility according to the present disclosure.

FIG. 1A is a diagram of a shopping cart 108 and an interactive display 106 in a facility according to the present disclosure. The shopping cart 108 can be operated in a facility 100 by a user. The shopping cart 108 can include a frame 112 having a handle portion 110, a basket 116 supported by the frame 112 and casters 114 configured to support the frame 112. The basket 116 can be configured to support and store physical objects 118. The shopping cart 108 can be moved to a computing system 104 including an interactive display 106. One or more RFID readers 102 can be disposed throughout the facility. In one example, an RFID reader 102 can be disposed proximate to the computing system 104 and/or can be operatively coupled to the computing system 104. The RFID reader 102 can be configured to communicate with the one or more RFID tags in response to the RFID tag being within a range of the RFID reader 102.

Figure 1B:
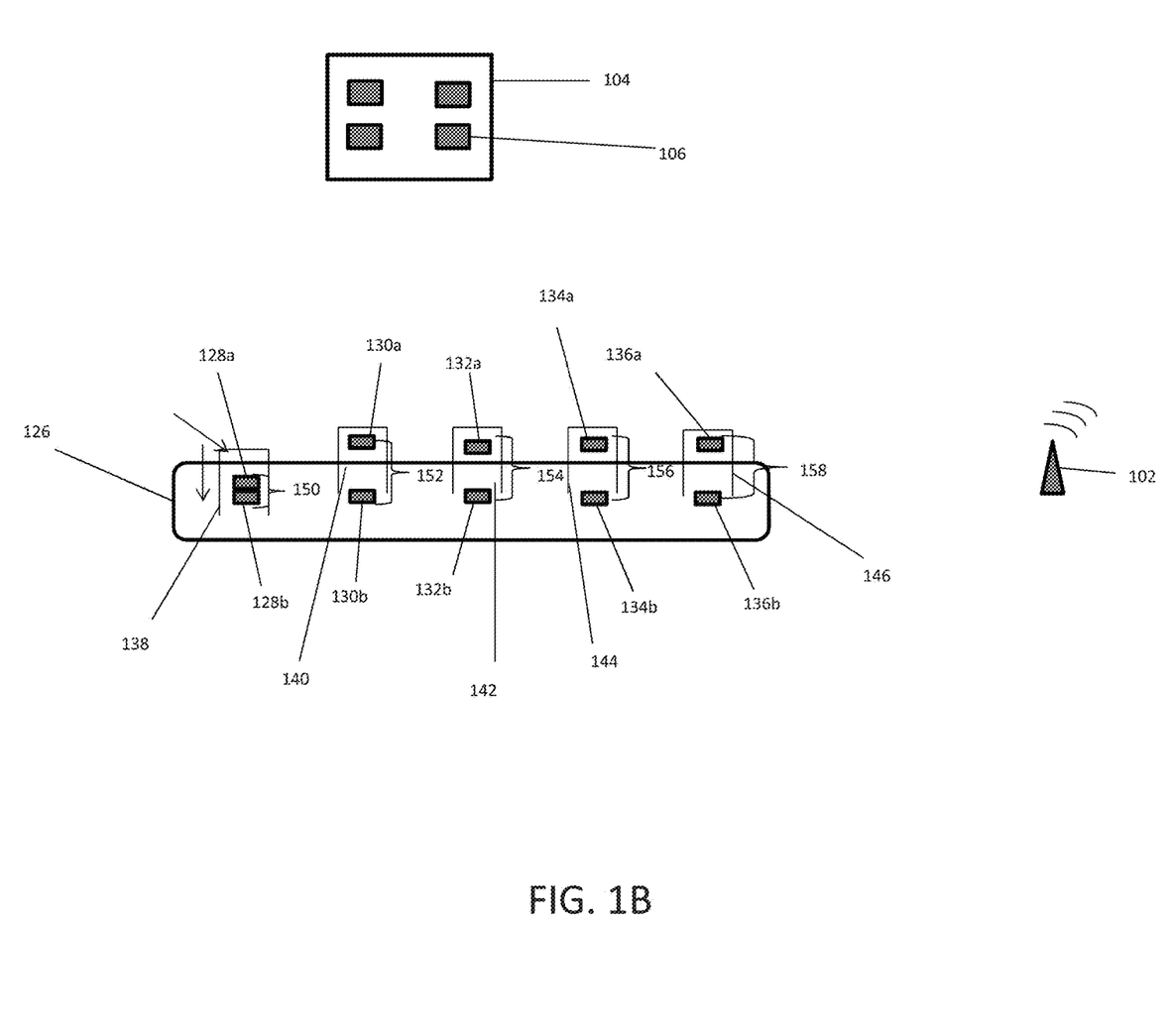
FIG. 1B is an exploded view of the handle portion of the shopping cart according to embodiments of the present disclosure.

FIG. 1B is an schematic view of the handle portion of the shopping cart according to embodiments of the present disclosure. As mentioned above, the handle portion 126 of the shopping cart can include one or more RFID tags 150-158. The RFID tags 150 can be used to interact with the interactive display 106 of the computing system 104. The RFID tags 150-158 can be associated with a unique identifiers. In some embodiments, the RFID tags 150-158 can include a far-field component and a near field component. The operational RFID tags 150-158 can be formed by mechanically and electrically coupling the near-field component and the far-field component. For example, the RFID tag 150 can include a near field component 128a moveably disposed in proximity to the far field component 128b, the RFID tag 152 can include a near field component 130a moveably disposed in proximity to the far field component 130b, the RFID tag 154 can include a near field component 132a moveably disposed in proximity to the far field component 132b, the RFID tag 156 can include a near field component 134a moveably disposed in proximity to the far field component 134b and the RFID tag 158 can include a near field component 136a moveably disposed in proximity to the far field component 136b. Alternatively, the far-field components can be moveably disposed with respect to the near-field components and/or the near-field and far-field components of each RFID tag can be moveably disposed with respect to each other. The near field component and/or far field component are moveable between a first or non-operational position in which the near-field component is spaced away from the far-field component to be mechanically and electrically decoupled from the near-field component and a second or operational position in which the near-field component is mechanically and electrically coupled to the far-field component. The far-field component can include an antenna and the near-field component can include an EPC tag including a unique identifying code (e.g. unique identifiers). The handle portion 126 can include discrete push buttons 138-146 corresponding to the RFID tags 150-158. The push buttons 138-146 may have a momentary or maintained operation. In response to being pressed a push button is moved to a depressed position and is activated. In the momentary arrangement, the push buttons 138-146 remain depressed/activated for only as long as they are pressed. When the momentary push button is released, the push button returns back to its original position and is deactivated. In some embodiments, the push buttons can maintain the depressed/activated for position for a time period in response to being pressed before returning to the original deactivated position. In the maintained arrangement, the push buttons 138-146 can remain in the depressed/activated position after being actuated until the push buttons are actuated again, which can return the push buttons to the original deactivated position.

The push buttons 138-146 can be physically biased away from the far-field component and can be physically connected to a near-field RFID tag. Such biasing can be accomplished using any of a variety of spring mechanisms including springs of various shapes, sizes, and materials. In one example, the near-field RFID tag can be placed on at an apex of an interior of a fully-resilient dome and the far-field component can be placed near a base of dome in alignment with the apex. By pushing on the dome, the near-field RFID tag is physically urged towards (and into contact with) the far-field component. Upon removing user pressure from the dome, the apex of the dome (and hence the corresponding near-field RFID tag) can return to the original position. When coupled as described above, a given near-field RFID tag can then communicate with a more distantly-located RFID reader. This communication can include transmitting, for example, information stored in the near-field RFID tag. By one approach, this information can be as limited and as simple as the unique identifier for the transmitting near-field RFID tag. The far-field component can be a far-field antenna which is tuned to a specified frequency.

For example, each of the push buttons 138-146 can be associated with an RFID tag 150-158. A near-field component or far field component of the RFID tag can be disposed at the top of the push button 138-146 and a near-field component or far-field component can be disposed towards the bottom of the push button 138-146. In response to being pressed downward (as indicated by the arrows in FIG. 1B), the near-field or far-field component of the RFID tag disposed at the top of the push button 138-146 can mechanically and electrically couple with near-field or far-field component of the RFID tag disposed toward the bottom of the push button 138-146. In response to the near-field component and far-field component mechanically and electrically coupling, the RFID tag can be read by the RFID reader 102. The RFID tags 150-158 can be passive tags. Passive RFID tags are tags that do not require an internal power source, and are powered with an electromagnetic energy transmitted by the RFID reader 102.

Figure 1C:
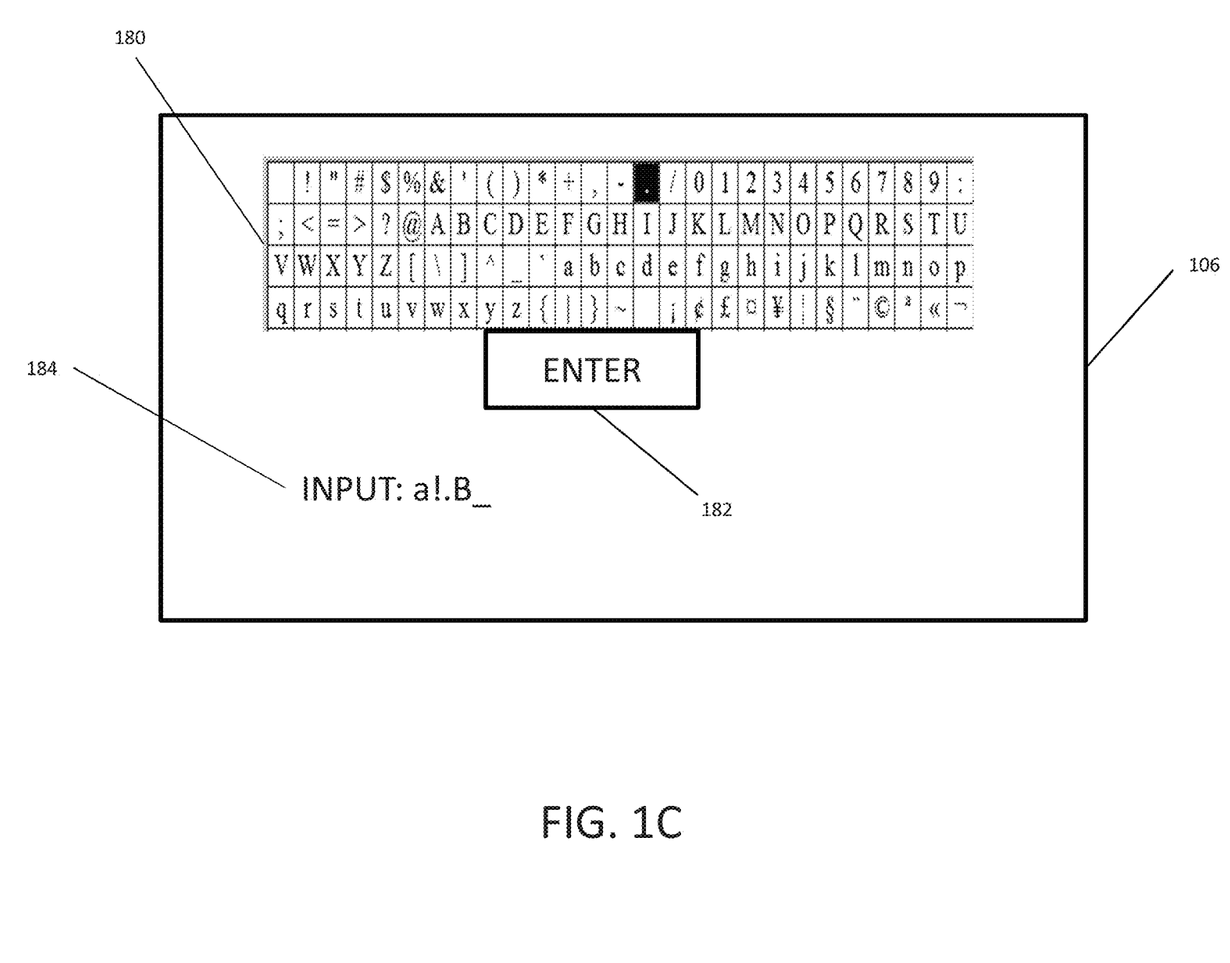
FIG. 1C illustrates the interactive display in accordance with an exemplary embodiment.

FIG. 1C illustrates the interactive display in accordance with an exemplary embodiment. In an exemplary embodiment, the RFID tags (i.e. RFID tags 150-158 as shown in FIG. 1B) can be used to enter alphanumeric text. For example, the interactive display 106 can render a selection of alphanumeric characters 180. A user can scroll on the screen using the RFID tags to select alphanumeric characters. The input 184 can also be rendered on the screen. The input 184 can be usernames, passwords, search requests or any other input for the computing system (e.g. computing system 104 as shown in FIGS. 1A-B). The user can submit the input by selecting the "ENTER" key 182.

Figure 2:
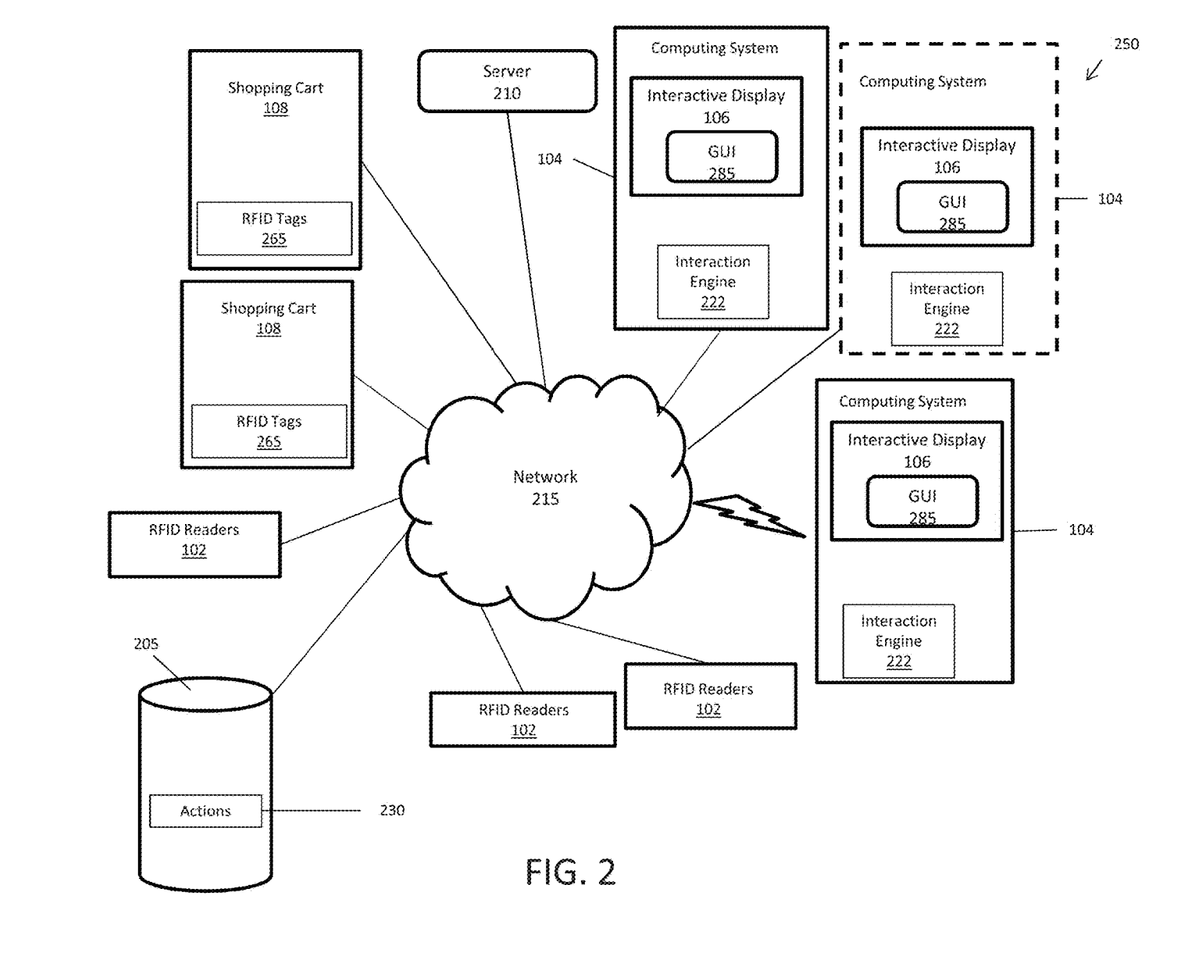
FIG. 2 illustrates an exemplary shopping cart interaction system in accordance with exemplary embodiments of the present disclosure.

FIG. 2 illustrates an exemplary shopping cart interaction system 250 in accordance with exemplary embodiments of the present disclosure. The shopping cart interaction system 250 can include one or more databases 205, one or more servers 210, one or more computing systems 104, one or more shopping carts 108 and RFID readers 102. The shopping carts 108 can include RFID tags 265. In exemplary embodiments, the computing system 104 is in communication with the databases 205, the server(s) 210, and multiple instances of the RFID readers 102, via a communications network 215. The computing system 104 can implement at least one instance of the interaction engine 222. The computing system 104 can also include an interactive display 106.

In an example embodiment, one or more portions of the communications network 215 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The server 210 includes one or more computers or processors configured to communicate with the computing system 104 and the databases 205, via the network 215. The server 210 hosts one or more applications configured to interact with one or more components computing system 104 and/or facilitates access to the content of the databases 205. In some embodiments, the server 210 can host the interaction engine 222 or portions thereof. The databases 205 may store information/data, as described herein. For example, the databases 205 can include an actions database 230. The actions database 230 can store identifiers associated with RFID tags and the correlated actions associated unique identifiers. The databases 205 and server 210 can be located at one or more geographically distributed locations from each other or from the computing system 104. Alternatively, the databases 205 can be included within server 210.

In exemplary embodiments, a user can operate a shopping cart 108 within a facility. The user can navigate the shopping cart to a computing system 104 with an interactive display 106. The user can interact and communicate with the interactive display 106 and the computing system 104 using the RFID tags 265 on the shopping cart 108. The user can intend to execute an action on the interactive display 106 of the computing system 104. The push buttons associated with the RFID tags 265 can be actuated or pressed to navigate through one or more graphical user interfaces 285 displayed by the interactive display 106 and/or to enter data into one or more data entry areas in the one or more graphical user interfaces 285. The action can be, scrolling on the interactive display, inputting information on the interactive display, and/or making selections on the interactive display. Each RFID tag 265 on the shopping cart can be correlated with at least one action. Each RFID tag 265 can also be associated with a unique identifier. The shopping cart 108 can include discrete push buttons that the user can push or actuate. Each discrete push button can be associated with a RFID tag 265 with a unique identifier and each RFID tag 265 can be correlated to an action which can be executed on the interactive display 106. Each RFID tag 265 can also include a near field component and a far field, which can be mechanically coupled in response to the discrete push button being pressed or actuated (as described herein). In some embodiments, the far-field component can be a far-field antenna which is tuned to a specialized frequency. The RFID tags 265 can be passive tags which do not require an internal power source, and are powered with an electromagnetic energy transmitted by the RFID reader 102. The RFID reader 102 can detect the RFID tag 265 in response to the coupling of the near-field and far field component. The RFID reader 102 can also detect an amplitude or signal power of the radiofrequency signal transmitted by the detected RFID tag 265. The user can attempt to interact with the interactive display 106 of a computing system 104 in a facility using the discrete push buttons. More than one computing system 104 can be disposed in the facility. The user can press or actuate a discrete push button to move the near-field and far-field components of the associated RFID tag from a non-operational position to an operational position such that the near-field and far-field components are mechanically and electrically coupled. The RFID reader 102 can detect and receive a radiofrequency signal from the RFID tag that includes the unique identifier and can determine the amplitude or signal power of the radiofrequency signal received by the RFID reader from the RFID tag 265, in response to the coupling of the near field and far field component. The RFID reader 102 can transmit the unique identifier and the amplitude or signal power of the radiofrequency signal of the detected RFID tag 265 to the computing system 104 within a predetermined proximity to the RFID reader. The computing system 104 can execute the interaction engine 222 in response to receiving the unique identifier and the detected amplitude or signal power. The interaction engine can determine whether the user was attempting to interact with the interactive display 106 of the computing system by determining whether the amplitude or signal power of the radiofrequency signal is greater than or below a specified threshold. In response to determining the amplitude or signal power is below specified threshold, the interaction engine 222 can determine the communications was not intended for the computing system 104 and can discard the unique identifier communicated by the RFID reader 102. Alternatively, in response to determining the amplitude or signal power is above a predetermined threshold, the interaction engine 222 can query the actions database 230 to retrieve the action correlated to the RFID tag 265 based on the unique identifier. The interaction engine 222 can execute the retrieved action on the interactive display 106.

The user can press or actuate two discrete buttons to execute two separate actions. For example, the user can press or actuate a first discrete button corresponding to a first RFID tag 265 to scroll left and press or actuate a second discrete button corresponding to a second RFID tag 265 to make a selection. The RFID reader 102 can detect and receive the first unique identifier associated with first RFID tag 265 and the second unique identifier associated with the second RFID tag 265. The RFID reader 102 can also receive a first and second amplitude or signal power associated with the radiofrequency signals from the first and second RFID tags 265. The RFID reader 102 can determine the order in which the first and second RFID tags were pressed or actuated. The RFID reader 102 can transmit the first and second identifier (as well as the first and second amplitudes or signal power) to the computing system 104 in the order the corresponding RFID tags 265 were pressed or actuated. The computing system 104 can execute the interaction engine 222 in response to receiving the first and second unique identifiers. The interaction engine 222 can determine whether the amplitude or signal power of the radiofrequency signals from the first and second RFID tags are greater than or less than a predetermined threshold. In response to determining the first and/or the second amplitude or signal power is below the specified threshold, the interaction engine 222 can determine the detected first and/or second identifiers communicated by the RFID reader 102 may not be intended for the computing system 104 and can discard of the first and/or second unique identifier. Alternatively, in response to determining the first and second amplitude is above a predetermined threshold the interaction engine 222 can query the actions database 230 to retrieve a first and second action correlated to first and second RFID tags, based on the first and second unique identifiers. The interaction engine 222 can execute the first and second action on the interactive display 106 in the order in which the computing system 104 received the corresponding first and second unique identifiers (i.e. scroll to the left and make a selection).

As a non-limiting example, the shopping cart interaction system 250 can be implemented in a retail store. The computing system 104 can be a Point of Sale (POS) terminal with an interactive display 106. The RFID reader 102 can be disposed with respect to the POS terminal. A customer operating a shopping cart in the retail store can navigate the shopping cart carrying products intended for purchase to a self-service POS terminal. The shopping cart 108 can include discrete push buttons that the user can push or actuate. Each discrete push button can be associated with a RFID tag 265 with a unique identifier and each RFID tag 265 can be correlated to an action which can be executed on the interactive display 106. Each RFID tag 265 can also include a near field component and a far field, which can be mechanically coupled in response to the discrete push button being pressed or actuated (as described herein). The RFID reader 102 can detect the RFID tag 265 in response to the coupling of the near-field and far field component. The customer can press or actuate two discrete buttons to execute two separate actions for scrolling to the "x" and selecting the "x.". The customer can press or actuate a first discrete button corresponding to a first RFID tag 265 to scroll to the "x" and press or actuate a second discrete button corresponding to a second RFID tag 265 to make a selection of the "x". The RFID reader 102 can detect and receive the first unique identifier associated with first RFID tag 265 and the second unique identifier associated with the second RFID tag 265. The RFID reader 102 can determine the order in which the first and second RFID tags were pressed or actuated. The RFID reader 102 can transmit the first and second identifier to the computing system 104 in the order the corresponding RFID tags 265 were press or actuated. The computing system 104 can execute the interaction engine 222 in response to receiving the first and second unique identifiers. The interaction engine 222 can query the actions database 230 to retrieve a first and second action correlated to first and second RFID tags, based on the first and second unique identifiers. The interaction engine 222 can execute the first and second action on the interactive display 106 in the order in which the computing system 104 received the corresponding first and second unique identifiers (i.e. scroll to the "x" and select "x").

Figure 3:
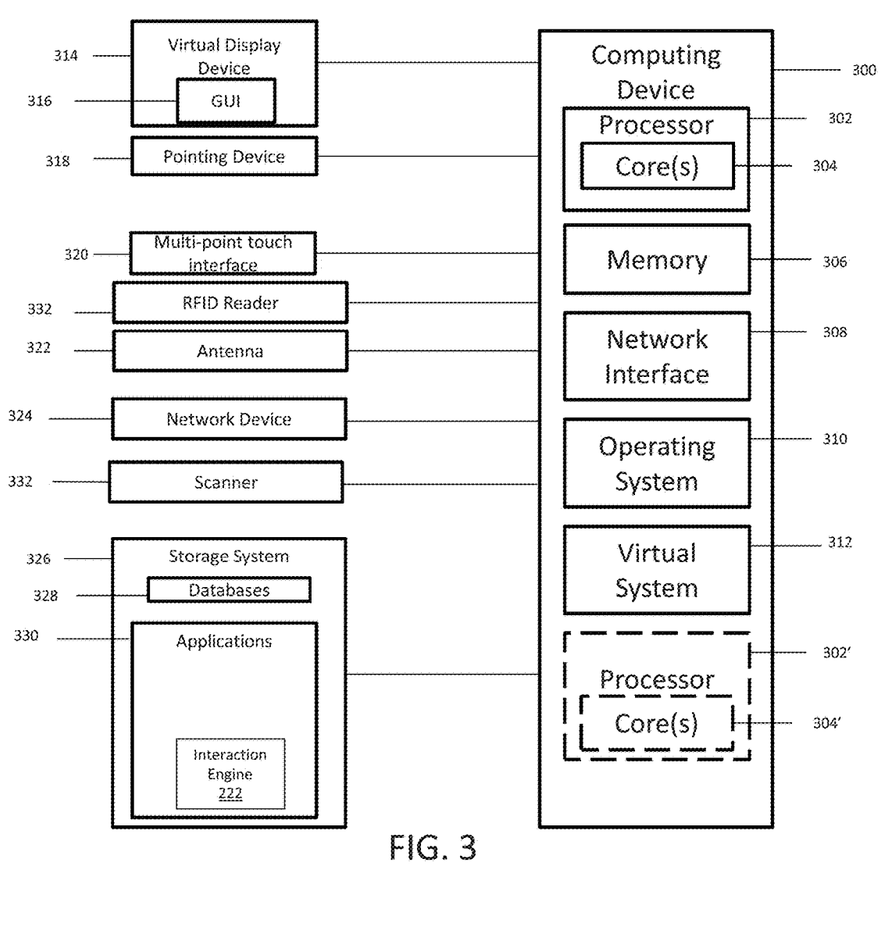
FIG. 3 illustrates an exemplary computing device in accordance with exemplary embodiments of the present disclosure.

FIG. 3 is a block diagram of an example computing device 300 for implementing exemplary embodiments of the present disclosure. Embodiments of the computing device 300 can implement embodiments of the interaction engine 222. The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 306 included in the computing device 300 may store computer-readable and computer-executable instructions or software (e.g., applications 330 such as the interaction engine 222) for implementing exemplary operations of the computing device 300. The computing device 300 also includes configurable and/or programmable processor 302 and associated core(s) 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for implementing exemplary embodiments of the present disclosure. Processor 302 and processor(s) 302' may each be a single core processor or multiple core (304 and 304') processor. Either or both of processor 302 and processor(s) 302' may be configured to execute one or more of the instructions described in connection with computing device 300.

Virtualization may be employed in the computing device 300 so that infrastructure and resources in the computing device 300 may be shared dynamically. A virtual machine 312 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 306 may include other types of memory as well, or combinations thereof.

A user may interact with the computing device 300 through a visual display device 314, such as a computer monitor, which may display one or more graphical user interfaces 316, multi touch interface 320 and a pointing device 318. The user can also interact with the visual display device via buttons on the handle portion of a shopping cart using RFID tags integrated with the shopping cart. The RFID tags can communicate with the computing device 300, via a RFID reader 332.

The computing device 300 may also include one or more storage devices 326, such as a hard-drive, CD-ROM, or other computer readable media, for storing data and computer-readable instructions and/or software that implement exemplary embodiments of the present disclosure (e.g., applications 330 e.g. interaction engine 222). For example, exemplary storage device 326 can include one or more databases 328 for storing information regarding the actions correlated to identifiers of RFID tags. The databases 328 may be updated manually or automatically at any suitable time to add, delete, and/or update one or more data items in the databases.

The computing device 300 can include a network interface 308 configured to interface via one or more network devices 324 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 322 to facilitate wireless communication (e.g., via the network interface) between the computing device 300 and a network and/or between the computing device 300 and other computing devices. The network interface 308 may include a built-in network adapter, network interface card, PCMCIA network card, card bus network adapter, wireless network adapter, USB network adapter, modem or any other device suitable for interfacing the computing device 300 to any type of network capable of communication and performing the operations described herein.

The computing device 300 may run any operating system 310, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 300 and performing the operations described herein. In exemplary embodiments, the operating system 310 may be run in native mode or emulated mode. In an exemplary embodiment, the operating system 310 may be run on one or more cloud machine instances.

Figure 4:
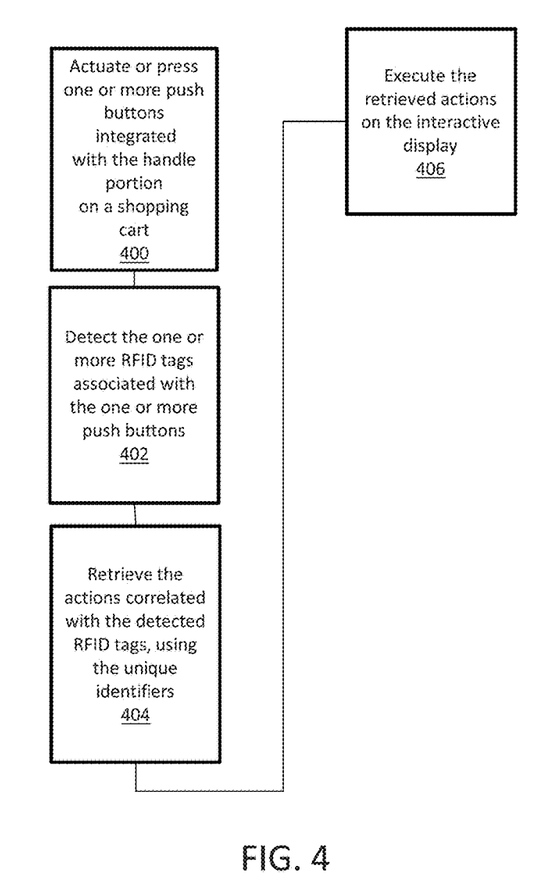
FIG. 4 is a flowchart illustrating an shopping cart interaction system according to exemplary embodiments of the present disclosure.

FIG. 4 is a flowchart illustrating a process implemented by the shopping cart interaction system according to exemplary embodiments of the present disclosure. In operation 400, a user can navigate a shopping cart (e.g. shopping cart 108 as shown in FIG. 1A, 2) to a computing system (e.g. computing system 104 as shown in FIGS. 1A-2) including an interactive display (e.g. interactive display 106 as shown in FIGS. 1A-2) and can actuate or press one or more push buttons (e.g. push buttons 138-146 as shown in FIG. 1B) associated with RFID tags (e.g. RFID tags 150-158, 265 as shown in FIGS. 1B-2) integrated with the handle portion (e.g. handle portion 110, 126 as shown in FIGS. 1A-B) on a shopping cart, to interact with the interactive display. Each RFID tag can include a near-field component and a far-field component (e.g. RFID near-field and far-field components 128a-b-136a-b as shown in FIG. 1B). The actuating or pressing of the one or more push buttons can mechanically couple the near-field component and far-field component of the RFID tag associated with the actuated button to place the RFID tag in the operational position. A unique identifier can be associated with each RFID tag. A RFID reader (e.g. RFID reader 102 as shown in FIGS. 1A-2) can be disposed with respect to the computing system. In operation 402, the RFID reader can detect the one or more RFID tags associated with the one or more push buttons actuated or pressed by the user, in response to the RFID tags being in range of the RFID reader and the near field component and the far field component mechanically and electrically coupling. The RFID reader can detect the unique identifiers associated with the one or more RFID tags detected. The RFID reader can transmit the unique identifiers to the computing system. In operation 404, the computing system can query the actions database (e.g. actions database 235 as shown in FIG. 2) to retrieve the actions correlated with the detected RFID tags, using the unique identifiers. In operation 406, the computing system can execute the retrieved actions on the interactive display, based on the one or more buttons actuated or pushed and the correlated RFID tags.

Figure 5:
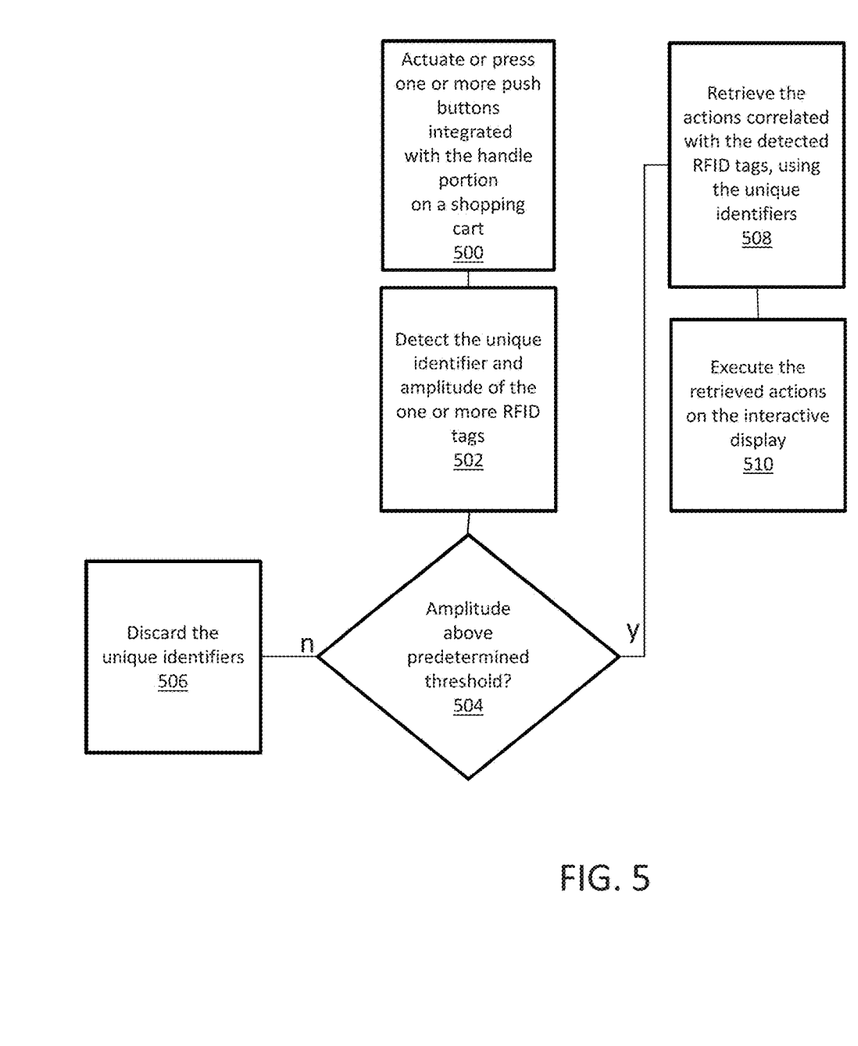
FIG. 5 is a flowchart illustrating an shopping cart interaction system with multiple computing systems according to exemplary embodiments of the present disclosure.

FIG. 5 is a flowchart illustrating a process implemented by the shopping cart interaction system including multiple computing systems according to exemplary embodiments of the present disclosure. In operation 500, a user can navigate a shopping cart (e.g. shopping cart 108 as shown in FIG. 1A, 2) to a computing system (e.g. computing system 104 as shown in FIGS. 1A-2) including an interactive display (e.g. interactive display 106 as shown in FIGS. 1A-2) and can actuate or press one or more push buttons (e.g. push buttons 138-146 as shown in FIG. 1B) associated with RFID tags (e.g. RFID tags 128-136, 265 as shown in FIGS. 1B-2) integrated with the handle portion (e.g. handle portion 110, 126 as shown in FIGS. 1A-B) on a shopping cart. Each RFID tag can include a near-field component and a far-field component. The actuating or pressing of the one or more push buttons can mechanically couple the near-field component and far-field component. A unique identifier can be associated with each RFID tag. A RFID reader (e.g. RFID reader 102 as shown in FIGS. 1A-2) can be disposed with respect to multiple computing systems. In operation 502, the RFID reader can detect the one or more RFID tags associated with the one or more push buttons actuated or pressed by the user, in response to the RFID tags being in range of the RFID reader and the near field component and the far field component mechanically coupling. The RFID reader can detect the unique identifiers associated with the one or more detected RFID tags. Furthermore, the RFID reader can determine one or more the amplitude or signal power of the radiofrequency signals received by the reader from the one or more detected RFID tags. The RFID reader can transmit the unique identifiers and detected amplitude or signal power to a computing system within a range of the RFID reader. In operation 504, the computing system can determine whether the detected amplitude or signal power is greater than a specified threshold. In operation 506, in response to determining the detected amplitude or signal power is less than the specified threshold, the computing system can discard the unique identifiers. In operation 508, in response to determining the detected amplitude or signal power is greater than the specified threshold, the computing system can query the actions database (e.g. actions database 235 as shown in FIG. 2) to retrieve the actions correlated with the detected RFID tags, using the unique identifiers. In operation 510, the computing system can execute the retrieved actions on the interactive display, based on the one or more buttons actuated or pushed and the correlated RFID tags.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. A shopping cart system comprising:
   a shopping cart including a frame having a handle portion, a basket supported by the frame, and a plurality of caster configured to support the frame;
   an actuator disposed on the handle portion;
   a plurality of RFID tags integrated with the handle portion, at least one of the plurality of RFID tags including a near field component and a far field component, wherein the near field component and the far field component are configured to be selectively coupled or decoupled in response to actuation of the actuator;

a plurality of RFID readers configured to communicate with the at least one of the RFID tags in response the at least one RFID tag being within range of the plurality of RFID readers and in response to the actuator being actuated to couple the near field component and far field component; and a plurality of computing systems, each computing system being coupled to at least one of the plurality of RFID readers and including an interactive display, each of the plurality of the computing systems being programmed to:

receive communications from the at least one of the plurality of RFID tags via the at least one of the plurality of RFID readers operatively coupled thereto in response the at least one RFID tag being within range of the at least one of the plurality of RFID readers and in response to the actuator being actuated to couple the near field component and far field component;

determine whether to process the communications based on signal power of the radiofrequency communications received by the at least one of the plurality of RFID readers;

in response to determining that the signal power of the communications is below a threshold signal power, ignore the radiofrequency communications; and in response to determining that the signal power of the radiofrequency communications is above a threshold power, identify data encoded in the communications and execute one or more actions on the interactive display in response to data.

2. The system in claim 1, wherein a database operatively coupled to the plurality of computing systems.

3. The system in claim 1, wherein the actuator includes a discrete push button.

4. The system in claim 1, wherein the near field component is a near field antenna and the far-field component is far-field antenna.

5. The system in claim 3, wherein the far-field antenna is tuned to a specified frequency.

6. The system in claim 1, wherein the plurality of the RFID tags are passive tags.

7. A method of interacting with a display associated with a first one of a plurality of computing systems via a shopping cart, each of the plurality of computing systems being coupled to at least one of a plurality of RFID readers, the shopping cart having a handle portion including an actuator for selectively coupling or decoupling a near field component and a far field component of at least one RFID tag in response to actuation of the actuator, the method comprising:

receiving, by the plurality of RFID readers, radiofrequency communications from the at least one RFID tag when the at least one RFID tag is within range of the plurality of RFID readers and in response to the actuator being actuated to couple the near field component the far field component;

receiving the radiofrequency communications at the plurality of computing systems from the plurality of RFID readers operatively coupled thereto;

determining, via a first one of the plurality of computing systems, whether to process the communications based on signal power of the radiofrequency communications received by the plurality of RFID readers;

ignoring the radiofrequency communications by the first one of the plurality of computing system in response the first one of the plurality of computing systems determining that the signal power of the radiofrequency communications is below a threshold signal power;

identifying, via the first one of the plurality of computing systems, data encoded in the communications in response to determining that the signal power of the radiofrequency communications is above a threshold power; and executing one or more actions on the interactive display associated with the first one of the plurality of computing systems based on the data encoded in the radiofrequency communications.

8. The method in claim 7, wherein a database is operatively coupled to the plurality of computing systems.

9. The method in claim 7, wherein the actuator includes a discrete push button.

10. The method in claim 7, wherein the near field component is a near field antenna and the far-field component is far-field antenna.

11. The method in claim 10, wherein the far-field antenna is tuned to a specified frequency.

12. The method in claim 7, wherein the at least one RFID tag is a passive tag.

* * * * *